July 26, 1927.

E. F. GOMEZ 1,637,254

BOLL WEEVIL EXTERMINATOR

Filed June 20, 1924   2 Sheets-Sheet 1

E. F. Gomez
INVENTOR

BY Victor J. Evans
ATTORNEY

WITNESS:

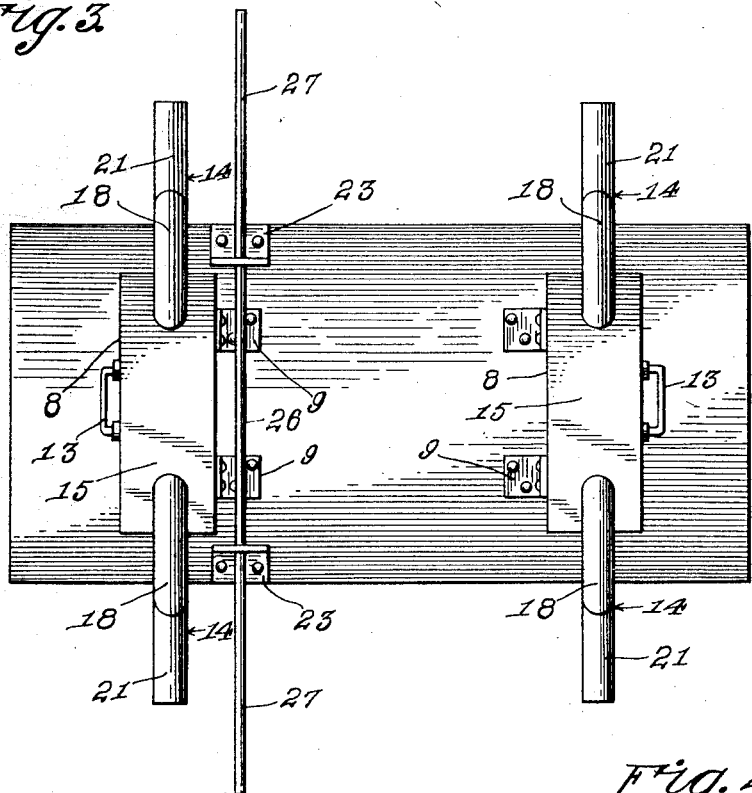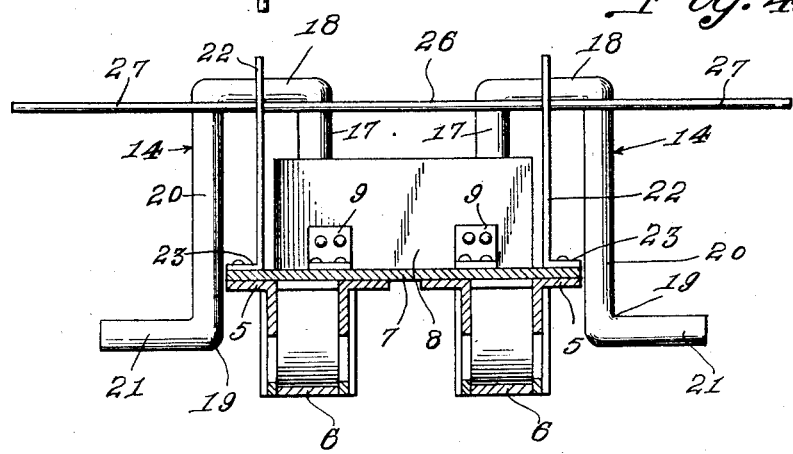

Patented July 26, 1927.

1,637,254

UNITED STATES PATENT OFFICE.

ETIENE FRANK GOMEZ, OF NEW ORLEANS, LOUISIANA.

BOLL-WEEVIL EXTERMINATOR.

Application filed June 20, 1924. Serial No. 721,334.

This invention contemplates the provision of a new and useful insect destroying machine, wherein means are employed for distributing the fumes of a chemical fluid, as the machine travels through a field over rows of cotton plants for moistening or spraying the plants with the fumes or fluid.

A further object of the invention aims in the provision of a novel means for wiping the cotton plants to aid in freeing the insects therefrom, after the plants have been thoroughly moistened by the fumes of the chemical fluid.

A still further object of the invention resides in the provision of a machine of the above stated character so constructed as to expeditiously and efficiently destroy boll weevil and other insects contained on the cotton plants.

The invention also aims to provide a device of the character above stated, providing a novel construction and arrangement of parts that will be strong, durable, simple and efficient and comparatively easy to construct and also one that may not likely get out of working order.

With the above and other objects in view the invention further includes the following novel features and details of construction to be hereinafter more fully described, illustrated in the accompanying drawings and pointed out in the appended claims.

In the drawings:—

Figure 3 is a top plan view.

Figure 4 is an end elevation partly shown in section.

Figure 1:
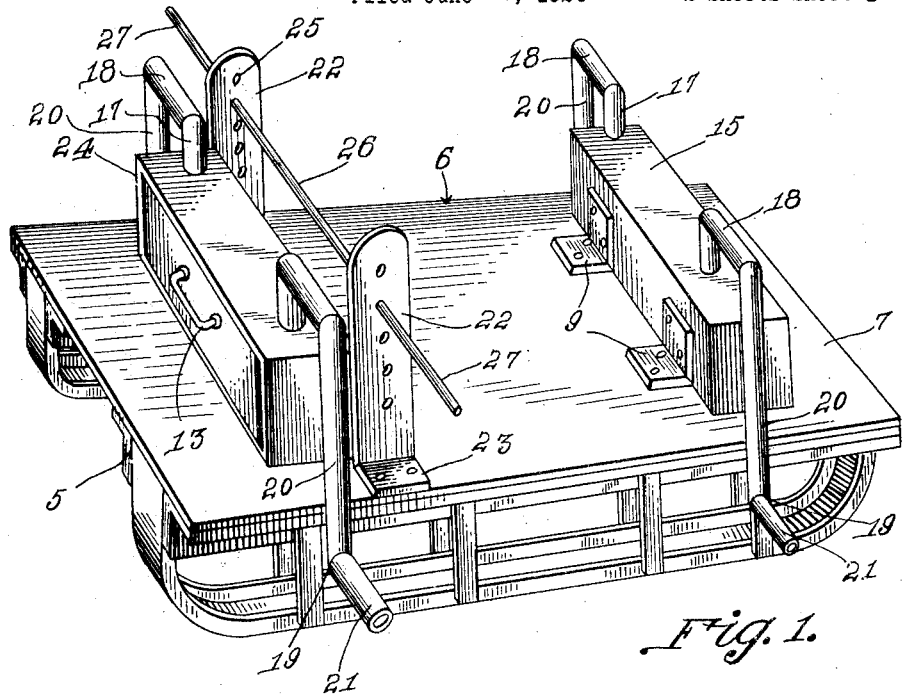
Figure 1 is a perspective view of the insect destroyer.
Figure 2:
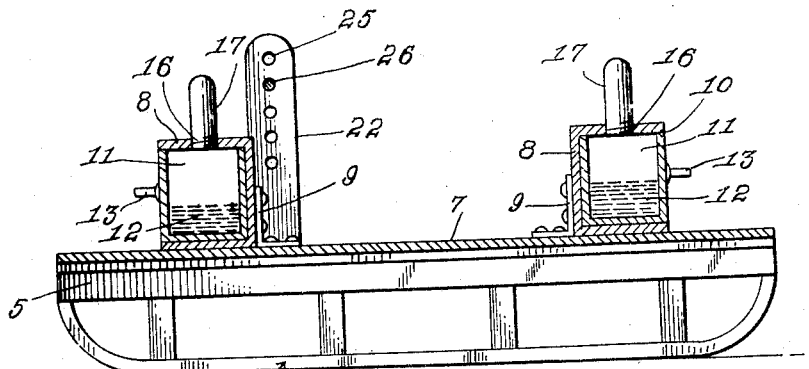
Figure 2 is a side elevation of the machine illustrating the chamber and ovens in section.

Referring more particularly to the accompanying drawings 5 denotes the metallic frame of the machine 6 the runners therefor and 7 a metallic table. This table is reposed upon the runners and is adapted to support the various parts forming the complete apparatus for destroying boll weevil and other insects from cotton plants.

To the end above commented upon, I employ a pair of chambers, designated by the character 8 and each of the chambers is fixedly secured upon and transversely of the table 7 through the medium of fasteners 9. The chambers when supported upon the table 7 are disposed in spaced parallelism one to the other and the open end 10 of each chamber receives an oven 11. These ovens are of substantially rectangular formation having a closed front, rear and bottom walls and an open upper end, to facilitate depositing within the ovens a combustible chemical fluid or dry substance like dry sulphur indicated by the character 12. A handle 13 is provided on the wall of each oven to facilitate the opening and closing of the oven within the chamber 8 when desired by the operator.

In order to facilitate the moistening of the rows of cotton plants as the machine progresses through the field, use is made of fluid distributing pipes 14 and each pipe being of substantially S-shaped configuration. Each pipe is secured to the top wall 15 of the chambers 8 at a point adjacent the opposite ends of said chambers and the inlet end 16 thereof communicates with the interior of the ovens 11. The inlet end is of substantially L-shaped configuration comprising a vertical portion 17 rising from and above the top wall 15 of the chambers and thence is extended in an upward lateral direction as at 18. The portion 18 of the outlet extremity of each distributing pipe is of such length as to slightly extend beyond the opposite longitudinal edges of the table 7, and terminates in an L-shaped outlet portion 19. The outlet portion of each pipe is likewise substantially of L-shaped form including a depending portion 20 and an outwardly lateral extending portion 21. The portions 21 of the distributing pipes are of sufficient length as to facilitate a proper moistening of the cotton plants with the fumes of the chemical fluid from the ovens 11, as the machine progresses through the field over rows of cotton plants.

In the practical operation of the machine it has been found to be advantageous in employing means for freeing the rows of cotton plants from the boll weevil and like insects after the moistening operation of the cotton plants, because assurance is then had that the plants are absolutely free from the insects. In carrying out my invention to this end I employ a pair of L-shaped uprights or stanchions indicated by the character 22 provided at their lower end with a lateral extending flange 23 fixedly secured to the table 7 of the machine at points substantially flush with the opposite longitudinal edges thereof and directly in the rear of the forward-most chamber 24. The vertical upright portion of the stanchion 22 is provided with a series of vertically aligned openings 25 to facilitate the mounting on the supports or stanchions 22 flexible wiping rods 26. It will be appreciated that these wiping rods may be of any appreciable length, and the extremities 27 thereof are adapted to protrude sufficient distances beyond the longitudinal edges of the table to facilitate the rods functioning to the end desired. Again, the purpose of the series of openings 25 is to permit of the relative vertical adjustment of the rods with respect to the support or stanchion 22, in accordance with the particular cotton plants to be treated with the chemical fluid.

Even though I have stated that the preferable contents of the ovens is to be a chemically treated fluid, I desire it to be understood that owing to the fact that these ovens are of steel construction, that any substance desired may be burned such as sulphur, found to be beneficial for destroying boll weevil from cotton plants.

While it is believed that from the foregoing description, the nature and advantages of the invention will be readily apparent, I desire to have it understood that I do not limit myself to what is herein shown and described, and that such changes may be resorted to when desired as fall within the scope of what is claimed. My improved insect destroying machine may be propelled in any desired manner.

Having thus described the invention what I claim as new is:—

1. A boll weevil exterminating machine comprising a metallic table, runners for supporting said table, a series of hollow chambers arranged upon the table at points adjacent the opposite ends thereof, ovens slidably mounted within said chambers, fume distributing pipes carried by each of said chambers and having the inlet ends thereof communicating with the ovens and the discharge ends thereof arranged beyond the opposite longitudinal edges of the table, and means interposed between said chambers for removing from the plants the insects.

2. A boll weevil exterminating machine comprising a metallic table, runners for supporting said table, a series of hollow chambers arranged upon the table at points adjacent the opposite ends thereof, ovens slidably mounted within said chambers, fume distributing pipes carried by each of said chambers and having the inlet ends thereof communicating with the ovens and the discharge ends thereof arranged beyond the opposite longitudinal edges of the table, and a flexible bar carried by said table.

3. A boll weevil exterminating machine comprising a metallic table, runners for supporting said table, a series of hollow chambers arranged upon the table at points adjacent the opposite ends thereof, ovens slidably mounted within said chambers, fume distributing pipes carried by each of said chambers and having the inlet ends thereof communicating with the ovens and the discharge ends thereof arranged beyond the opposite longitudinal edges of the table, and a vertically adjustable flexible bar carried by said table.

ETIENE FRANK GOMEZ.